United States Patent Office 3,429,105
Patented Feb. 25, 1969

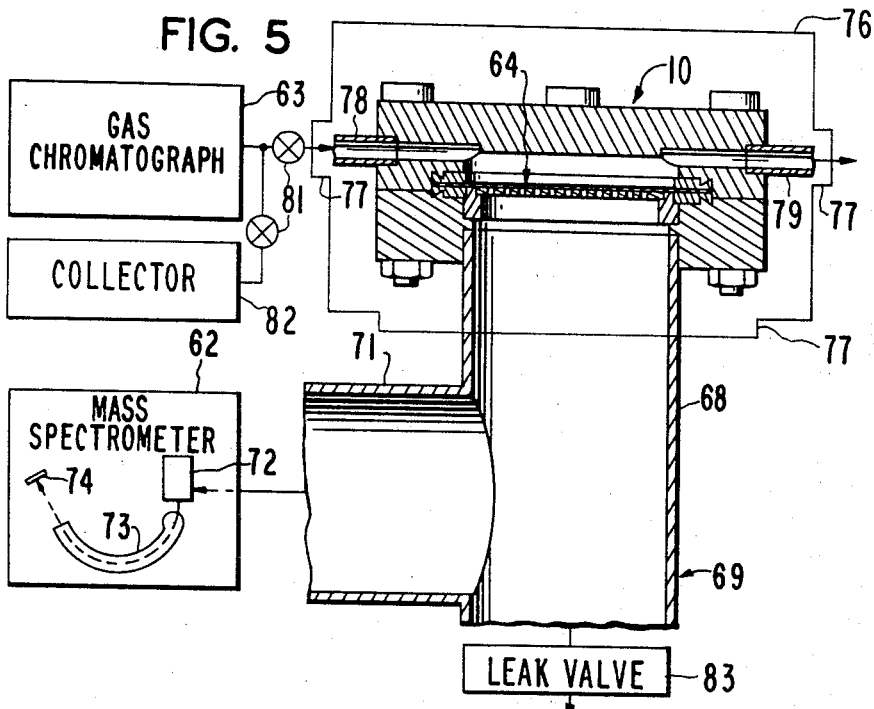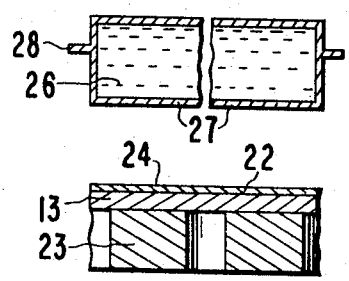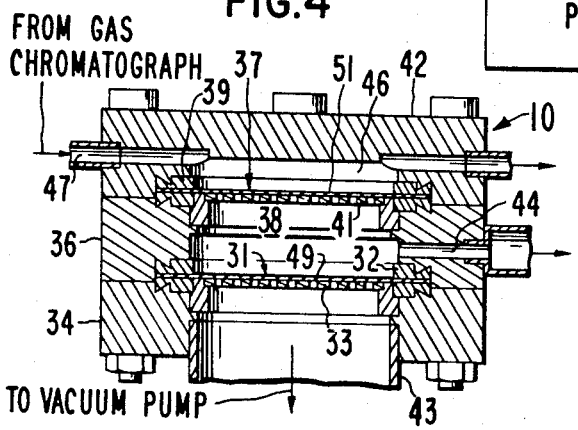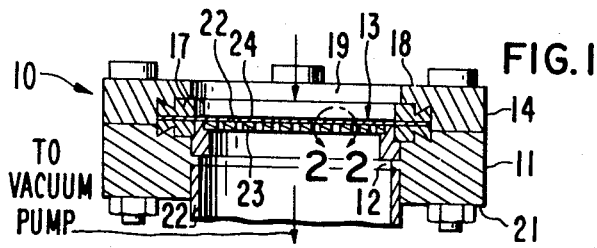

3,429,105
STAGED GAS INLET SYSTEM FOR GAS ANALYZERS AND GAS ANALYZING SYSTEM FOR EMPLOYING SAME
Peter M. Llewellyn, Menlo Park, and Duane P. Littlejohn, Santa Clara, Calif., assignors to Varian Associates, Palo Alto, Calif., a corporation of California
Continuation-in-part of application Ser. No. 511,794, Dec. 6, 1965. This application July 6, 1966, Ser. No. 563,235
U.S. Cl. 55—158   10 Claims
Int. Cl. B01d *13/00*

ABSTRACT OF THE DISCLOSURE

An inlet system for a gas analyzer which separates certain gaseous constituents from a mixture of gases to provide a highly enriched sample to the analyzer while at the same time allowing the fluid pressure conditions on the down stream side of the separator to remain substantially independent of the fluid pressure conditions on the upstream side. A pair of spaced permeable membranes free of holes and of which the ratio of the permeabilities of the permanent gases to the nonpermanent gases is less than unity comprise the separating elements. Vacuum pumping means are provided for reducing the pressures across the membranes.

---

The present invention is a continuation-in-part application of copending patent application Ser. No. 511,794, filed Dec. 6, 1965, and now abandoned.

The invention relates generally to systems for analyzing gaseous state materials. More particularly, it relates to a staged gas inlet system which discriminates against the introduction of permanent gases into a gas analyzer, and a gas analyzing system employing same. Permanent gases are those gases commonly found in air which have a boiling point substantially below zero degrees centigrade.

Oftentimes in analyzing gaseous state materials, such as naturally occurring gases and vapors originating from solids and liquids, extraneous gases are present which render the analysis difficult to accomplish and in some cases virtually impossible. In many cases, the analysis is complicated because of difficulties encountered in separating the extraneous gases from those of interest. This is especially characteristic of the permanent gases and particularly when such gases are present in concentrations which are orders of magnitude greater than those of the gaseous state materials of interest. For example, conventional mass spectrometers are capable of handling gases at a maximum flow rate of approximately $10^{-3}$ torr liters/second, although under optimum operating conditions this figure generally is maintained at $10^{-5}$ torr liters/second. In those cases where such gas analyzers are employed to investigate various gases separated by a gas chromatograph, only a fraction of the gases issuing from the chromatograph can be analyzed. This is because the flow rate of the issuing gases is generally about 1 torr liter/second. It is not unusual to find the concentration ratio of the carrier gas (generally a permanent gas) and gases of interest to be of the order of $10^5$ to 1. Under such conditions, reducing the flow rate of the mixture to the spectrometer while maintaining the concentration ratio of the constituents constant would render mass analysis insensitive. This is clearly seen when it is considered that the actual concentration of the gas of interest would be reduced to such a low level that the mass spectrometer would be relatively insensitive to its presence.

In addition, when a gas chromatograph is coupled to a gas analyzer, it is necessary to provide a pressure drop between the chromatographic column, which operates at atmospheric pressure, and the analyzer which operates at pressures ranging from $10^{-2}$ to $10^{-8}$ atmospheres depending upon the particular gas analyzer employed.

To overcome these problems, it has been the practice to enhance the concentration ratio in favor of the gas of interest by extracting the carrier gas from the mixture while simultaneously lowering the flow rate of the gases issuing from the chromatograph and reducing the pressure. Typical apparatus for accomplishing the foregoing are described in the articles "Breakthrough in Identifying GC Effluent Fractions" by J. Throck Watson, Laboratory Management, July 1965, and "Use of a Mass Spectrometer as a Detector and Analyzer for Effluents Emerging From High Temperature Gas Liquid Chromatography Columns," by Raynar Ryhage, Analytical Chemistry, April 1964. Although such apparatus are arranged to preferentially remove a particular permanent carrier gas present, they also remove some of the gas of interest. Hence, it is seen that where the concentration of the gas to be removed is considerably greater than the gas of interest, care must be taken to insure against the removal of too much of the gas of interest and concomitant insufficient enhancement of the concentration of the gas of interest. Furthermore, the degree of enhancement of the concentration ratio in favor of a selected gas component of a mixture at the expense of the undesirable permanent gases accomplished by such devices varies with fluctuations in pressure and gas flow rate.

Other techniques also are employed to accomplish the separation of permanent gases from other gases of interest. These techniques generally involve collecting samples of the mixture in a cold trap and subsequently liberating the collected gas for introduction into appropriate gas analyzers. Because such techniques require discontinuous steps of collecting, handling and introducing, they generally are less desirable than the aforementioned.

Considerable advantage is therefore to be gained by the provision of an inlet system for introducing gaseous state materials directly from a source, into gas analyzers which discriminates against permanent gases without detrimentally impeding the introduction into the analyzer of other gases to be analyzed. Other advantages will be realized where the inlet system is adapted to receive material in the liquid phase and allow gaseous diffusion of the material into the analyzer.

The present invention provides an apparatus which accomplishes the foregoing and thereby overcomes those limitations and disadvantages characteristic of the prior art devices. More particularly the system of the present invention for analyzing gaseous state materials, comprises a plurality of spaced apart membranes mounted in gas flow communication with a vacuum pump or other suitable pressure determining means for establishing a pressure differential across the membranes. Preferably, the membranes are constructed from materials selected from the group consisting of polymers and stationary liquid phases. Stationary liquid phases are those liquid materials employed in chromatographic columns to partition materials to be separated. Comprehensive lists of such materials can be found in numerous publications, one being "Gas Chromatography" by Ernst Bayer, published by Elsevier Publishing Company, New York, 1961, Tables 2, 13 and 14.

Polymers and stationary liquid phases are characterized by generally being free of holes. Hence, gaseous state material can pass through such material only by diffusion. However, in order to diffuse through the membrane, the gaseous state material must first be captured by the membrane either by entering into solution therewith or adhering thereto. Although most gases can be captured by such membrane materials, the permanent gases generally will not be captured, especially at elevated temperatures, i.e., substantially above zero degrees centigrade.

This property of the membrane materials is employed to facilitate anlyzing selected gaseous state materials. In operation, a pressure difference is established between opposing surfaces of the membranes. The material which is to be analyzed is communicated to the surface of the membrane at the higher pressure. Gaseous state materials, except the permanent gases, will readily enter into solution with the membrane material and diffuse therethrough. The gaseous state materials which diffuse through the membranes may then be directed to any suitable gas analyzer for analysis. It is important to note that the ratio of the gases of a mixture passed by the membrane is independent of pressure and gas flow fluctuations.

Since gaseous state materials tend to diffusion in the direction of establishing a uniform concentration of particular gaseous state materials throughout a closed system, it is only necessary that a partial pressure difference relative to the gas of interest be established across each membrane. Of course, establishing an absolute pressure difference across the membrane accomplishes this.

Contrary to the principle of operation of prior art devices, the inlet system of the present invention accomplished the enrichment of selected gases of a mixture by extracting for use the selected gases from the mixture while rejecting the extraneous permanent gases. Such an inlet system is characterized by being free from those limitations imposed on the prior art devices by their very nature.

Accordingly, it is an object of this invention to provide apparatus for enhancing the concentration of selected gaseous state materials at the expense of other gaseous state materials of a mixture being introduced into a gas analyzer.

More particularly, it is an object of this invention to provide apparatus for conveying selected gaseous state materials into a gas analyzer while rejecting permanent gases.

It is a further object of this invention to provide apparatus for extracting selected gaseous state materials exclusive of permanent gases from a mixture including permanent gases for introduction into a gas analyzer.

It is a further object of this invention to provide a gas inlet system for gas analyzers to facilitate communicating gas chromatographs directly thereto.

It is still a further object of this invention to provide a gas discriminating inlet system for gas analyzers whose gas enhancement characteristic is substantially independent of pressure and gas flow fluctuations.

Yet another object of this invention is to provide a gas analyzing system capable of selectively analyzing certain gaseous state materials from a gas mixture environment.

Still another object of this invention is to provide a gas analyzing system capable of instantly analyzing selective gaseous state materials of a mixture issuing from a source.

It is yet another object of this invention to provide a gas analyzing system having a gas analyzer with a gas inlet which discriminates against the introduction of permanent gases into the gas analyzer without detrimentally impeding the introduction therein of the gases to be analyzed.

Yet a further object of this invention is to provide a gas analyzing system for analyzing gaseous state materials present in minute amounts in a gas mixture, e.g., 1 part in $10^5$, instantly as the mixture issues from its source.

Yet still a further object of this invention is to provide a gas analyzing system including a gas analyzer wherein certain gases of a gas mixture can be separated on command from a gaseous stream of the mixture and instantly introduced into the gas analyzer.

Additional objects and advantages of the invention will become apparent from the following description and claims considered together with the accompanying drawing, of which:

FIG. 1 is a cross sectional view of one embodiment of the gas inlet system,

FIG. 2 is an enlarged cross sectional view of the area delineated by line 2—2 in FIG. 1, FIG. 3 is a cross sectional view of a stationary liquid phase embodiment of the membrane employed in the gas inlet system of the present invention, FIG. 4 is a cross sectional view of a two stage embodiment of the gas inlet system, and FIG. 5 illustrates one use of the gas inlet system of the present invention.

Referring to FIG. 1, the gas inlet system 10 of the present invention is seen to include a base flange member 11 defining an aperture 12. A membrane 13 is mounted to one end 14 of member 11 to hermetically seal that end of the member. As shown, the hermetic seal is accomplished by utilizing a metal vacuum joint of the type disclosed in U.S. Pat. 3,208,758 by Maurice A. Carlson et al. entitled "Metal Vacuum Joint." In such an arrangement the membrane 13 is mounted between two soft metal gaskets 17 of the joint. The hermetic seal is formed by clamping the gaskets 17 between the member 11 and cap member 18 which defines an aperture 19 for communication with a source of gaseous state material.

Diffusion of selected gaseous state materials through membrane 13 is induced by establishing a pressure differential across the membrane 13. As noted supra, this pressure differential may be a partial pressure differential with the pressure higher on the source side of membrane 13. To maintain the desired pressure differential, an end 21 of member 11 is hermetically connected by, for example, a conduit 22 brazed thereto to a suitable vacuum pump (not shown). The vacuum pump is operated to establish the desired pressure differential across membrane 13 with the lower pressure in the region defined by membrane 13, member 11 and conduit 22.

The effectiveness of membrane 13 in rejecting permanent gases while allowing other gases while allowing other gaseous state materials to pass therethrough is influenced by the material of the membrane, the thickness of the membrane and the temperature of the membrane. As noted hereinbefore, materials selected from the polymers and stationary liquid phases have been found to work satisfactorily. In those instances where stationary liquid phases form the membrane 13, a suitable reservoir supporting structure must be provided. For example, a reservoir constructed from a polymer or a fine screen mesh capable of supporting the liquid by surface tension would be suitable. However, other materials will work if relative to gaseous state materials they are free of holes, and if the permanent gases will not enter into solution with the material. As utilized herein, entering into solution is defined as a process of condensation and then mixing of the gaseous state material in the surface layers of membrane 13. (See Physics and Chemistry of the Organic Solid State, edited by David Fox, Mortimer M. Labes, and Arnold Weissberger, published by Interscience Publishers, New York, 1965, vol. 2, page 517.)

All materials defined hereinabove are characterized by an optimum operating temperature range within which a gaseous state material will enter into solution therewith. Generally, this range falls within the extremes of $-100°$ to $400°$ centigrade.

Gases take a definite time to pass or diffuse through any medium. When a barrier, such as membrane 13, is communicated to a constant pressure gaseous state material source, the rate at which gases emerge from the side of membrane 13 distal the source increases from zero asymptotically to a constant rate. For a particular gaseous state material and a particular membrane material maintained at a given operating temperature, the time required for the gas to reach this constant rate of emergence from the membrane 13 is given by the equation $$\tau \approx 3\left(\frac{d^2}{6D}\right) \qquad (1)$$

where $\tau$ is the time in seconds, $d$ is the thickness of the membrane 13 in inches, and D is the diffusion coefficient of the particular gaseous state material in the particular membrane material at the operating temperature of the membrane 13 in square inches per second.

The diffusion coefficient, D, for any gaseous state material through any membrane material can be determined from Equation 1 by establishing a constant arbitrary pressure differential across a sample of a selected membrane material of any thickness maintained at some constant temperature, and monitoring the rate at which the gaseous state material emerges from one side of the membrane as the other side of the membrane is exposed to the particular gaseous state material of interest.

In order to minimize the difference between the period over which a given quantity of gaseous state material reaches the source side of membrane 13 and the time required for such quantity to emerge from its distal side, preferably, the thickness and material of membrane 13 is selected so that for the particular gaseous state materials of interest the following inequality expression is satisfied.

$$\frac{d^2}{6D} < 100 \text{ seconds} \qquad (2)$$

where the parameters are as defined hereinabove. This condition is particularly important when the gas inlet system 10 is employed under circumstances where the interval over which a particular quantity of gaseous state material issues from its source is controlling on the analysis of the gaseous state material. For example, in investigating several gaseous state materials issuing from a gas chromatograph, it is most desirable to minimize the tendency of the membrane 13 to spread the chromatographic peaks, especially in those cases when the interval between the issuance of successive time separated gases is short.

As is apparent from the above description, the effectiveness of the membrane 13 in allowing gases to diffuse therethrough is inversely related to the thickness of the membrane. It is a particularly important consideration where the gas of interest is a minute part of a mixture, e.g., one part in $10^5$. Under such circumstances, a membrane thickness of less than 20 mils is recommended.

The inlet system 10 described hereinabove may be employed to introduce gaseous state materials into a gas analyzer 62 from various gas sources 63. For example, as illustrated in FIGS. 4 and 5, the inlet system 10 is employed to introduce gases originating from a gas chromatograph source 63. However, gaseous state material originating from a liquid or even volatile solids can be introduced by the inlet system. In such cases, a liquid, for example, would be placed in a reservoir defined by the top surface 22 of membrane 13 and the apertured cap member 18. If the vapor pressure relative to the material of membrane 13 is too low to render a quantity of gaseous state material which can be detected by the gas analyzer 62, the vapor pressure may be increased by heating the liquid.

In one embodiment constructed in accordance with FIG. 1, a five mil thick polysiloxane polymer membrane 13 having a cross sectional area of about one square inch was employed. In order to furnish additional support for membrane 13, a perforated support 23 was secured beneath membrane 13. A gas mixture including for example one part hexane gas per ($10^5$) parts helium was directed over the top surface 22 of membrane 13. The gas mixture diffusing through membrane 13 was monitored by a gas analyzer and found to be enriched in hexane gas by a factor of 500.

Additional gaseous enrichment or discrimination may be achieved by covering at least surface 22 of membrane 13 with a coating 24 of stationary liquid phase. This is best depicted in FIG. 2. The thickness of the stationary liquid phase coating 24 is a matter of choice, generally selected in accordance with those considerations mentioned supra with respect to membrane 13.

An alternative construction of a membrane is illustrated in FIG. 3. As depicted therein, a stationary liquid phase 26 is confined within a closed liquid tight relatively thin walled vessel 27 constructed from a gas permeable material. Preferably, the vessel material is selected from the polymers. By providing vessel 27 with supporting tabs 28 mounted circumferentially therearound, the vessel 27 can be mounted in the inlet system in the same way as membrane 13. (See FIG. 1.) The gas inlet system 10 employing a single membrane 13 thus far described and a gas analyzing system including the inlet system 10 is claimed in a copending application Ser. No. 511,756 filed and assigned to the assignee of this application.

It has been found that by providing a plurality of spaced apart membranes arranged in staged fashion along the gas flow path, the enrichment of selected gases at the expense of the permanent gases can be enhanced many orders of magnitude. In FIG. 4, a two stage embodiment of the inlet system 10 is illustrated which includes a first polymeric membrane 31 supported in hermetically sealed relation by a first soft metal annular gasket 32 and a first perforated disc 33 between first and second annular flange members 34 and 36 respectively of a metal vacuum joint.

A second polymeric membrane 37 is mounted space above membrane 31 to define a chamber 38 therebetween. Membrane 37 is hermetically mounted by a second soft metal annular gasket 39 and a second perforated disc 41 between an apertured recessed cap member 42 and second member 36. Cap 42, member 36 and gasket 39 form a metal vacuum joint.

A first vacuum pump (not shown) is mounted in gas tight relation to first member 34 by a conduit 43 brazed thereto. The vacuum pump is operated to establish a desired pressure differential across the first membrane 31 and thereby facilitate the diffusion of gaseous state material through membrane 31. A second vacuum pump (not shown) is hermetically communicated to chamber 38 by a passageway 44 of a selected gas conductance defined by second member 36. The second vacuum pump is operated to establish a predetermined pressure in chamber 38 higher than that established by the first pump and to extract out a portion of the gaseous state material entering chamber 38 through second membrane 37. The amount of gas extracted by the second pump will depend upon the relative gas conductances of first membrane 31 and passageway 44. The amount of gas passing through second membrane 37 is determined by the pressure differential between chamber 38 and chamber 46 defined by recessed cap 42 and membrane 37. For a given gas and membrane material, the conductance of membrane 31 is determined by its thickness and cross sectional area. The type of gas of interest and membrane material fixes its solubility constant and its diffusion rate through the membrane, hence the permeability of the membrane to a given gas.

In one application of the two state inlet system, a gas mixture of 0.1 microliter of heptane, octane, nonane and decane contained in helium issuing from a gas chromatograph at a gas flow rate of 60 milliliters per minute was introduced at atmospheric pressure into chamber 46 through an inlet 47. The thickness and cross sectional area of membrane 37 were one mil and one square inch respectively. The helium gas flow rate through membrane 37 was found to be about 0.002 cubic centimeter per second while the gas flow rate of decane was 2 cubic centimeters per second. Hence, the enrichment of decane in the gas mixture entering chamber 38 was a factor of about 1000.

To preferentially remove helium from the gas mixture contained in chamber 38, the length and cross sectional area of passageway 44 was adjusted to be 0.5 inch and 0.003 square inch respectively. A mechanical type vacuum pump was employed to remove the gases emerging from passageway 44 and to establish a chamber pressure of about 100–200 microns, a helium gas flow rate through passageway 44 of about 10 cubic centimeters per second and a decane gas flow rate of about 2 cubic centimeters per second. Hence, an additional enrichment by a factor of 2000 was obtained; the overall enrichment of decane being about $2 \times 10^6$. This is exceedingly better than has been accomplished in the prior art when it is considered that enrichments of only 50–100 are commonly obtained.

If it is desired to improve the discrimination or enhancement of certain gases directed through membranes 31 and 37, a selected stationary liquid phase coating 49 and 51 may be applied to one surface of the membranes 31 and 37 respectively. By proper selection of the coating material, the gas enrichment may be enhanced orders of magnitude over that achieved without the coatings. Also, by proper selection of the coating material, discrimination between polar and non-polar gaseous state materials may be accomplished.

Considering now FIG. 5, the gas inlet system 10 is shown as employed with a conventional mass spectrometer gas analyzer 62 to inspect effluent as it issues from a gas chromatograph source 63. A gas flow across a stationary liquid phase coated polymeric membrane 64 is caused by the flow from the gas chromatograph 63. A pressure differential is established across membrane 64 by connecting a vacuum pump 67 to one end of the bar member 68 of a T-type gas conduit 69, the other end of the bar 69 mounted to membrane 64. The stem member 71 of conduit 69 conveys a portion of the gas mixture which passes through membrane 64 to the gas ionizer 72 of spectrometer 62. The ionized gases are accelerated and directed to a magnetic field established by sectored magnets 73 whereat they undergo mass separation. The mass separated gases are detected for analysis by collector 74. Instead of the parallel gas flow connection of vacuum pump 67 and gas analyzer 62, the pump could be connected in series with the analyzer 62 and the membrane 64 mount to pump through the analyzer. To control and maintain membrane 64 at a desired operating temperature, the gas inlet system 10 is disposed within a temperature controlled oven 76. Oven 76 is provided with ports 77 to couple conduit 69, and inlet port 78 and outlet port 79 of gas inlet system 10 to the exterior of oven 76.

The gaseous state material inlet system of the present invention can be adapted to other gas analyzers as well. For example, infra-red or microwave mass analyzers could be connected to receive the gases from stem 71 of conduit 69. Furthermore, gas measuring devices such as ion gauges, sputter-ion vacuum devices, thermal conductivity devices or other equivalent means can be coupled to stem 71 of conduit 69 to monitor the effluent emerging from gas chromatographs.

Supplementary benefits evolve from the use of the inlet system of the present invention. For example, in those instances where the inlet system is employed to remove helium from a gas mixture, sputter ion pumps may be employed to evacuate the relatively helium free portion of the system. Furthermore, since for a given membrane various gases will have different solubility constant and diffusion rates, the various gases will require longer times to pass through the membrane. Hence, the inlet system of the present invention could be employed in some cases to accomplish a time-dependent separation of gases of non-permanent gas mixtures.

Often the effluent issuing from gas chromatographs includes a large amount of solvent used to dissolve the material to be analyzed by gas analyzer 62. Since the solvents normally employed issue in large quantities from the chromatograph 63 prior to the dissolved material, and since they readily diffuse through the membrane employed in the inlet system 10, they tend to contaminate the analyzer 62 and render analysis of the gaseous state material of interest difficult if not virtually impossible. To prevent the large solvent peak, or for that matter any undesirable gaseous state material, from reaching the analyzer 62, it is contemplated that a valve means 81 will be interposed in the gas flow path between the chromatograph 63 and analyzer 62. The valve means 81 is operable to prevent or allow, upon command, the flow of gaseous state materials from chromatograph 63 to analyzer 62. In its most preferred embodiment valve means 81 is interposed between chromatograph 63 and gas inlet system 10. This placement of the valve means 81 prevents the contamination of the membrane of the inlet system 10. Where it is desired to collect the gaseous state material prevented from flowing to analyzer 62, a valve means 81 can be selected which is operable to divert the flow to a gas sink or collector 82.

The inlet system 10 has been described as operating with a pressure differential across the membrane where one of the pressures is maintained below atmospheric. However, the inlet system can be employed in environments requiring a differential between pressures in the range above atmospheric. In such cases, a pressure reduction means 83 would be interposed in the gas flow path between the vacuum pump and membrane to establish the desired pressure differential across the membrane. Such a pressure reduction means could be a leak valve of the type described in U.S. patent application Ser. No. 400,515 and now U.S. Patent No. 3,391,901 by William R. Wheeler, et al. entitled "High Vacuum Leak Valve" filed Sept. 30, 1964, and assigned to the assignee of this application.

Furthermore, it is to be appreciated, that it is not necessary that the gaseous state material source provides a gas flow in the nature of a stream. For example, the gas inlet system of the present invention can be employed to analyze the gas content of the atmosphere to aid in air pollution studies by exposing the membrane 64 directly to the atmosphere.

Therefore, while the present invention has been described with respect to various specific embodiments, it will be apparent that numerous modifications and variations are possible within the spirit and scope of the invention. Thus, the foregoing description is not intended to limit the invention except by the terms of the appended claims.

What is claimed is:

1. An inlet system for coupling a gas analyzer in gas flow communication with a gas chromatograph comprising a vacuum seal means including an apertured base flange member, an apertured spacer flange, and a recessed cap member having an inlet and outlet communicating with said recessed portion, said cap member adapted for mounting to said spacer with the recess in facing relation thereto, said inlet being connected to said gas chromatograph, said spacer defining a passageway of a selected gas conductance transpiercing a wall thereof; a first membrane hermetically mounted between said spacer and cap to cover the aperture of said spacer; a second membrane hermetically mounted between said spacer and said base member to cover the aperture of said base member, said membranes constructed of materials selected from the group consisting of polymers and stationary liquid phases; means for connecting said gas analyzer to receive gases which pass through said second membrane; and a vacuum pumping means connected to establish selected pressures in the space between said membranes and said analyzer.

2. The inlet system according to claim 1 further defined as comprising a perforated support member mounted below each of said membranes to render support thereto.

3. The inlet system according to claim 1 wherein said vacuum pump means includes a mechanical vacuum pump communicated through said passageway to the space between said membranes operative to establish a first selected pressure therein, and a sputter ion vacuum pump communicated to the gas flow path between said gas analyzer and membrane proximate thereto operative to establish a second selected pressure therein less than said first pressure.

4. The inlet system according to claim 1 wherein the thickness and material of said membranes are selected to satisfy the inequality expression $$d^2/6D < 100 \text{ seconds}$$

where:
 $d$ is the thickness of the membrane in inches, and
 $D$ is the diffusion coefficient of the gaseous state materials being introduced into said analyzer in the membrane material at the operating temperature of the membrane in square inches per second.

5. The inlet system according to claim 1 further comprising means to maintain said membranes at selected temperatures.

6. An inlet system for a gas analyzer means for separating certain gaseous state materials from a mixture of those materials and other gaseous state materials and for introducing those separated materials into the input of said gas analyzer means comprising: cap means, apertured spacer means and base means forming an input chamber, an intermediate chamber and an output chamber respectively, said chambers being arranged in series and separated respectively by permeable membranes constructed of a material free of holes and of which the permeability of permanent gases and the permeability of other gases is in a ratio of less than unity, said input chamber having an inlet and an outlet such that said mixture may be passed through said chamber and in communication with the membrane separating said input chamber and said intermediate chamber, said output chamber being in communicating relationship with a vacuum pumping means and with said gas analyzer means such that certain predetermined gaseous state materials passing through said input chamber are communicated through said membranes to said gas analyzer means.

7. An inlet system for a gas analyzer means as described in claim 6 wherein pressure determining means are provided for reducing the pressure in said intermediate chamber independent of the operation of said vacuum pumping means thereby increasing the separative capability of said inlet system.

8. An inlet system for a gas analyzer means as recited in claim 7 wherein means are provided for maintaining said membranes at selected temperatures thus improving the selectivity characteristics of said inlet system.

9. In a gas analyzing system including a gas chromatography means, a mass spectrometer means and an inlet system for communicating the gaseous effluent flow path of said gas chromatography means with the input flow path of said mass spectrometer means, said inlet system comprising; cap means, apertured spacer means, base means and a pair of permeable membranes assembled so as to form an inlet chamber, an intermediate chamber, and an outlet chamber arranged in series and separated by said permeable membranes, said inlet chamber including means for directing said effluent flow into communication with the membrane separating said inlet chamber and said intermediate chamber such that certain gaseous constituents thereof are captured by said membrane and caused to permeate therethrough into said intermediate chamber wherein the permeant is caused to communicate with the other of said membranes such that certain gaseous constituents of said permeant are captured thereby and caused to permeate through said membrane into said outlet chamber, pressure reducing means communicating with said intermediate chamber for reducing the pressure in said intermediate chamber, and other pressure reducing means communicating with said outlet chamber and said mass spectrometer such that the separated gaseous constituents communicated through said membranes may be introduced into the input of said mass spectrometer means at a substantially reduced pressure.

10. In a gas analyzing system as recited in claim 9 wherein means are provided for controlling the temperature of said membranes.

References Cited

UNITED STATES PATENTS

| 2,966,235 | 12/1960 | Kammermeyer | 55—16 |
| 3,208,758 | 9/1965 | Carlson et al. | 285—336 |
| 3,256,675 | 6/1966 | Robb | 55—158 |
| 3,335,545 | 8/1967 | Robb et al. | 55—16 |

OTHER REFERENCES

Ryhage: "Use of a Mass Spectrometer as a Detector and Analyzer for Effluents Emerging From High Temperature Gas Liquid Chromatography Columns," Analytical Chemistry, vol. 36, No. 4, 1964, pp. 759–764.

REUBEN FRIEDMAN, *Primary Examiner.*

CHARLES N. HART, *Assistant Examiner.*

U.S. Cl. X.R.

55—197; 73—23.1